UNITED STATES PATENT OFFICE.

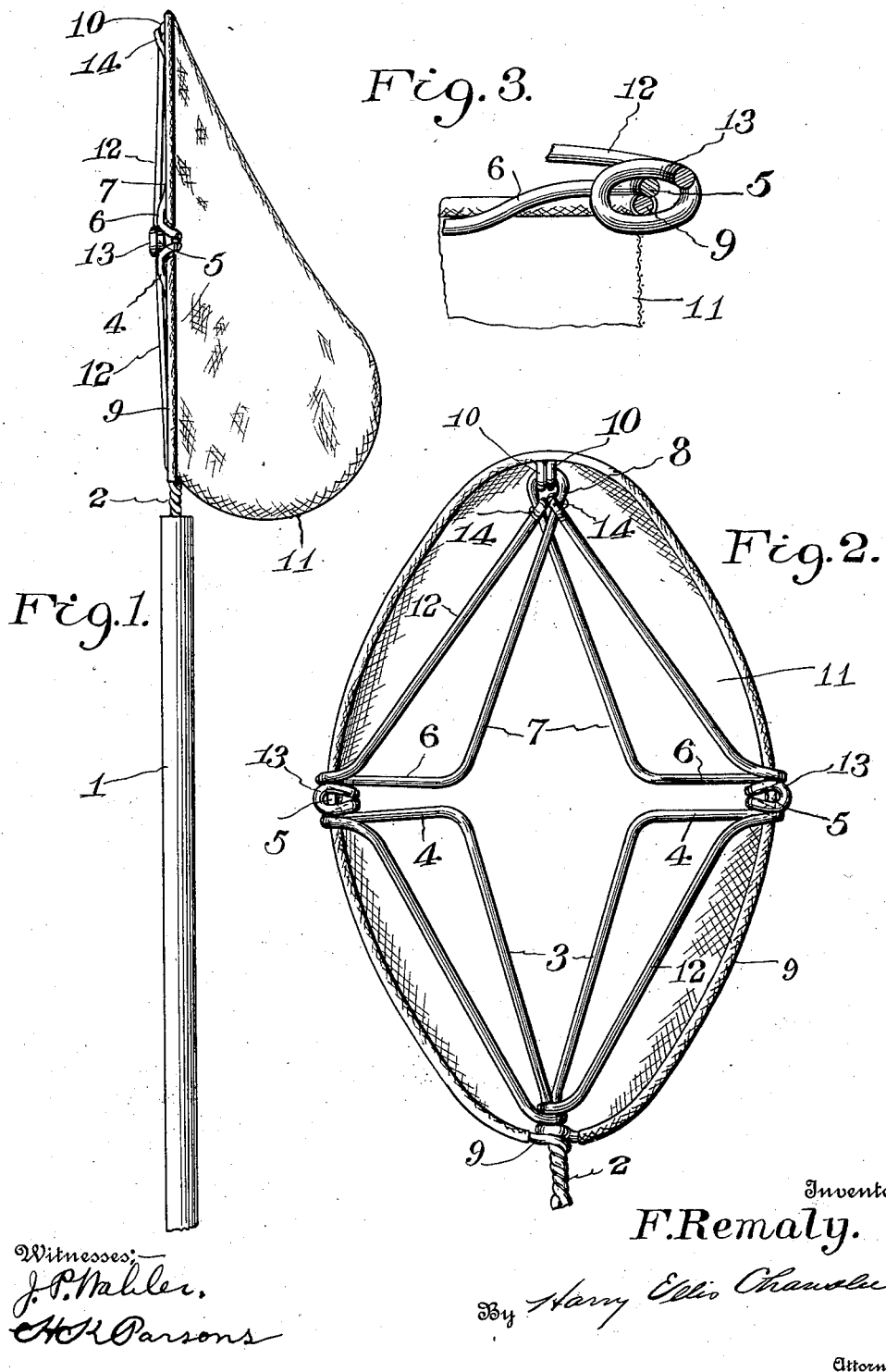

FRED REMALY, OF ROSCOE, IOWA.

FRUIT-PICKER.

1,026,770.　　　　　Specification of Letters Patent.　　Patented May 21, 1912.

Application filed July 26, 1911. Serial No. 640,552.

*To all whom it may concern:*

Be it known that I, FRED REMALY, a citizen of the United States, residing at Roscoe, in the county of Des Moines and State of Iowa, have invented certain new and useful Improvements in Fruit-Pickers, of which the following is a specification.

My invention relates to improvements in fruit pickers, and has for its leading object the provision of an improved device of this character adapted for use in removing apples, peaches or other fruit from high branches of trees where the same is otherwise inaccessible.

The further object of my invention is the provision of an improved form of fruit picking device by which thoroughly ripe fruit may be readily seized and brought to the ground without bruising or damaging the same.

Another object of my invention is the provision of an improved form of bracing frame and of improved means for attaching the frame and the bag supporting portion of my device to the fruit picking member.

Other objects and advantages of my improved fruit picker will be readily apparent by reference to the following description taken in connection with the accompanying drawings and it will be understood that I may make any modifications in the specific structure shown and described within the scope of my claims without departing from or exceeding the spirit of the invention.

Figure 1 represents a side elevation of my complete device. Fig. 2 represents a front plan view of the picker and bag portion, and Fig. 3 represents an enlarged detailed sectional view of the means for securing the picker to the bracing and bag supporting frame.

In the drawings, the numeral 1 designates the wooden handle of my device which has fitting thereinto the twisted ends 2 of the picker frame, said picker frame being substantially cruciform and having the handle 2 continued in the slightly diverging arms 3 bent outward in the portion 4 terminating in a loop 5 and being then extended inward in the arms 6 terminating in the converging arms 7 which cross each other and are connected by the loop 8 at the outer end of the picker.

To pick the fruit it is merely necessary to engage the stems thereof between the arms 7 or between the arms 4 and 6 when a pull on my device will cause the same to bear against the fruit and break the stem thereof, the central portion of my device being sufficiently large to allow the fruit to readily pass down therethrough. To prevent the fruit so picked from dropping to the ground and thus being bruised, I provide my improved bag supporting frame 9 which has its ends twisted around the portion 2 of the picker frame and has formed intermediately therein a loop 10 which is adapted to be engaged in the loop 8 of the picker frame to securely hold the bag supporting frame and the picker frame together. Depending from the frame 9 is a bag 11 of suitable size to receive and hold the fruit picked by my device.

In order to strengthen my fruit picking device, I preferably twist around the portion 2 of the picker the ends of the brace frame 12 which is of substantially diamond shape and has diagonally opposite corners formed with hooks 13 which are bent around intermediate-portions of the bag supporting frame 9 and are engaged in the loops 5 of the picker frame and thus serve to tightly bind the loops 5 of the picker frame and the adjacent portions of the bag supporting frame together. The terminal ends of the said bracing frame diagonally opposite the portion of said frame which is wound on the portion 2 of the picker frame are formed into eyes 14 which are secured to the loop portion 8 of the picker frame and thus serve to securely hold and brace said portions of the picker frame.

From the foregoing description taken in connection with the accompanying drawings the construction of my improved fruit picker will be readily understood, and it will be seen that to pick the fruit it is merely necessary to pass the central portion of the frame upward above the fruit and then to draw any of the pairs of arms down on the fruit to pull the same loose, the improved bracing frame of my device serving both to brace the picker as the same is used to pick the fruit and also serving to securely connect bag frame and the picker to brace both of said parts against both the strain of pulling loose the fruit and also against the force of the fruit dropping into the bag 11.

I claim:

1. A fruit picker, comprising a cruciform frame having loops formed at the ends of certain of its arms and having one arm twisted for engagement in a handle, a bag supporting frame having a looped portion formed at one end and engaged in one of the loops of the cruciform frame and having its end twisted around the handle engaging portion of the cruciform frame, and a bracing frame disposed exterior to the cruciform frame and having portions directly secured to the handle engaging portion of the picker frame and to one of the other arms of the cruciform frame and having hooked portions formed therein and engaged around the bag frame and in the other loops of the picker frame for securely connecting and bracing the various parts of the device.

2. In a fruit picker, the combination with a bag supporting frame having an integral loop formed at one end, of a picker frame having a loop portion adapted to engage the loop of the bag supporting frame, the ends of the picker frame opposite its looped portion being twisted for engagement with a handle, the meeting ends of the bag supporting frame being secured to the twisted ends of the picker frame, and a brace frame disposed between the bag supporting frame and picker frame.

In testimony whereof I affix my signature, in the presence of two witnesses.

FRED REMALY.

Witnesses:
W. I. BURKHOLDER,
J. M. SLAVEN.

---

Copies of this patent may be obtained for five cents each, by addressing the "Commissioner of Patents, Washington, D. C."